Dec. 22, 1970   J. J. SUTYAK   3,549,216
FLUID BEARING ARRANGEMENT

Filed Jan. 2, 1969

INVENTOR.
John J. Sutyak
BY
Buell Blenko + Ziesenheim
HIS ATTORNEYS

INVENTOR
John J. Sutyak
BY
Buell Blenko & Ziesenheim
HIS ATTORNEYS

United States Patent Office 3,549,216
Patented Dec. 22, 1970

3,549,216
FLUID BEARING ARRANGEMENT
John J. Sutyak, Pittsburgh, Pa., assignor to Mesta Machine Company, Pittsburgh, Pa., a corporation of Pennnsylvania
Filed Jan. 2, 1969, Ser. No. 788,479
Int. Cl. F16c 1/24
U.S. Cl. 308—122                 17 Claims

ABSTRACT OF THE DISCLOSURE

I disclose a fluid bearing arrangement comprising a shaft mounted for rotation thereof, a plurality of eccentric bearing members positioned on said shaft for rotation therewith, a bearing stator generally surrounding said bearing members and closely spaced therefrom, said stator being positioned substantially concentrically of said shaft, said eccentric bearing members being orientated with respect to said shaft so that their directional eccentricities are spaced equidistantly about said shaft whereby upon rotation of said shaft a rotating and compensating bearing force field is created.

---

The present invention relates to a fluid bearing arrangement and more particularly to a hydrodynamic bearing having a stabilizing feature designed to prevent whirl or eccentric rotation of a shaft or spindle utilizing the fluid bearing. For certain applications, my invention includes a combined hydrodynamic and hydrostatic bearing arrangement.

Previous hydrodynamic bearing structures, in varying degrees, permitted the rotating shaft or spindle to rotate eccentrically of its longitudinal axis. Although the extent of resulting eccentricity various among the available prior art bearings and although in some cases the eccentricity is quite small, a noticeable spindle or shaft chatter results in many applications. This unavoidable spindle chatter, caused by spindle or shaft whirl or eccentric rotation, is of course considerably magnified in high-speed equipment using bearings of the character described. For example, in roll grinders, lathes, and various rolling mill structures even a slight amount of rotative eccentricity and the resulting spindle or shaft chatter is intolerable.

In addition to the introduction of uncontrollable tolerances of various kinds, owing to spindle or shaft chatter, eccentric rotation of the spindle of shaft frequently causes the conventional fluid bearings to overheat. As a result operating efficiency is reduced, and in many cases the fluid bearings or the shaft journals associated therewith are damaged.

These problems have been considered at various times in the past with varying degrees of success. For example, fluid bearing arrangements for minimizing shaft vibrations or whirl are shown in the United States patents to Klahn Re. 20,305; Moller No. 2,068,458, and Sternlicht No. 3,110,525 and No. 3,132,906. The Klahn arrangement includes a rotor which is revolved about a central stator and thus is inapplicable to applicant's arrangement. Therefore, the Klahn arrangement does not teach the introduction of a fluid bearing medium through a rotating part as in certain forms of my invention. Further, there is no distribution of varying bearing forces about the rotating member for the purpose of reducing eccentricity.

A similar arrangement as seen in Sternlicht '525 in which the rotating shaft obviously is subject to eccentric rotation or whirl.

The Moller arrangement is a floating type bearing for a compass shaft or spindle wherein shaft whirl or wobble obviously is not a problem.

Sternlicht '906 provides for certain applications a satisfactory solution of the problem in that the extent of shaft eccentricity or whirl is reduced. Sternlicht accomplishes this by distributing hydrodynamic bearing forces equidistantly about the rotating shaft. However, the resultant bearing forces induced by the Sternlicht bearing are essentially stationary so that in a horizontally rotating shaft of significant weight, the equivalent force component of the shaft weight distorts Sternlicht's stationary bearing forces. The resulting centering forces intended by operation of the Sternlicht bearing are likewise distorted, and an appreciable rotative eccentricity remains.

None of the references of which I am aware provide adequate means for applying a substantially equal adjustment to the bearing forces of a hydrodynamic bearing and for reducing the manufacturing complexity thereof. Likewise I am unaware of any successful fluid bearing arrangement which combines hydrostatic and hydrodynamic bearing forces in connection with a rotating shaft or spindle. Finally, none of the cited references provides a rotating or otherwise movable force field in connection with a rotating shaft or spindle for the purposes of nullifying for reducing the effects of shaft weight, manufacturing tolerances, bearing force adjustment, entry of foreign materials, and the like.

I overcome the disadvantages of the prior art by providing a stationary fluid bearing component which is concentric with the shaft axis and also with the axis of rotation of the shaft. Eccentric members are located on the shaft for rotation therewith in juxtaposition with the stationary bearing member. These rotating eccentric members cooperate with the concentric and stationary bearing member in the induction of hydrodynamic bearing forces. These bearing forces are spaced equidistantly about the rotating shaft but rotate as the shaft rotates. As a result, the rotation and bearing force field thus induced is largely independent of or compensates the aforementioned effects, such as shaft weight, variable tolerances, etc.

I also provide a unique arrangement of the bearing stator for adjusting the magnitude of the developed hydrodynamic forces. Means are further provided for making this adjustment normally affect each component of bearing force in a substantially equal manner. The association of this adjustment means with revolution of the bearing forces ensures, moreover, an identical adjustment in each of the component bearing forces. An identical adjustment, on the other hand, would be exceedingly unlikely in conventional hydrodynamic bearings where bearing forces are applied at essentially static locations about the rotating shaft or spindle. In addition, I provide a universal mounting for the static bearing component to ensure its alignment with the axis of shaft rotation.

In the case of larger rotating shafts or spindles, I provide, in accordance with another feature of my invention, means for inducing a hydrostatic bearing force which supplements the hydrodynamic bearing forces and aids in supporting the weight of the shaft itself. My invention also contemplates a unique arrangement for introducing bearing fluid into a fluid bearing of the character described.

I accomplish these desirable results by providing a fluid bearing arrangement comprising a shaft mounted for rotation thereof, a plurality of eccentric bearing members positioned on said shaft for rotation therewith, a bearing stator generally surrounding said bearing members and closely spaced therefrom, said stator being positioned substantially concentrically of said shaft, said eccentric bearing members being oriented with respect to said shaft so that their directional eccentricities are spaced equidistantly about said shaft whereby upon rotation of said shaft a rotating and compensating bearing force field is created.

I also desirably provide a similar fluid bearing arrangement wherein said bearing members are provided in the form of discrete eccentric washers or annuli and are positioned on a journal of said shaft, said journal being concentric of said bearing stator.

I also desirably provide a similar fluid bearing arrangement wherein said bearing stator is provided in the form of a split ring and wedge means are insertable therein adjacent said split for adjusting the fluid clearances between said bearing members and said stator.

I also desirably provide a similar fluid bearing arrangement wherein means are provided for introducing a bearing fluid under pressure between each of said bearing members and said bearing stator.

I also desirably provide a similar fluid bearing arrangement wherein said fluid introducing means includes a shallow recess formed in each of said bearing members.

I also desirably provide a similar fluid bearing arrangement wherein said fluid introducing means includes a shallow recess formed in each of said bearing members, so that hydrostatic forces developed by said pressurized fluid in said recesses supplements hydrodynamic forces developed by rotation of said bearing members.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein.

Figure 1:
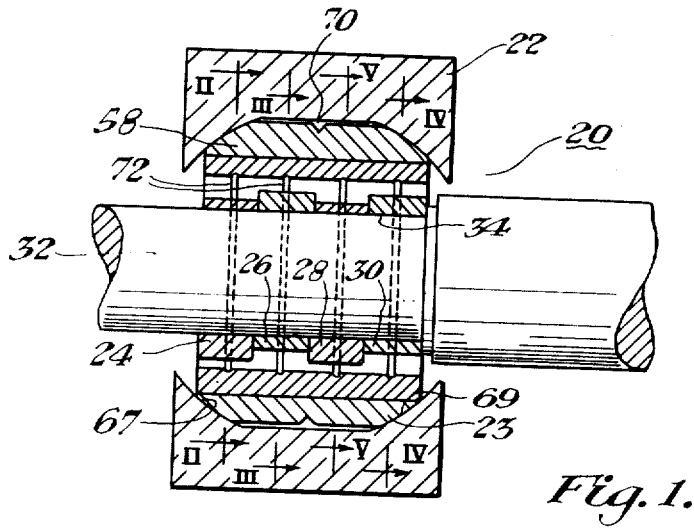
FIG. 1 is a longitudinally sectioned view of one form of fluid bearing arrangement according to the present invention.
Figure 2:
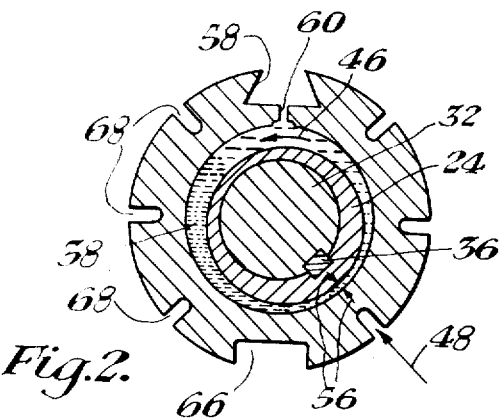
FIGS. 2–5 are cross sectional views of the bearing arrangement of FIG. 1 taken respectively along reference lines II—II, III—III, IV—IV, and V—V thereof.
Figure 3:
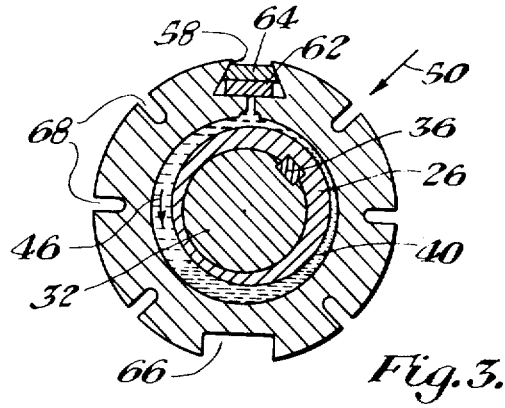
Figure 4:
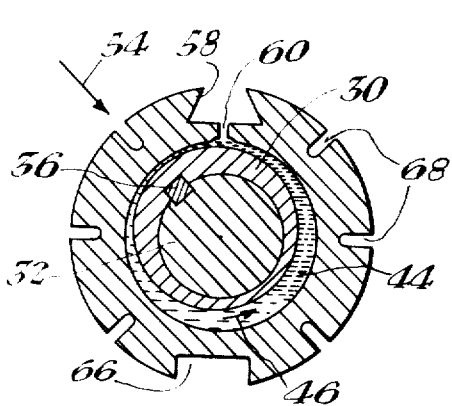
Figure 5:
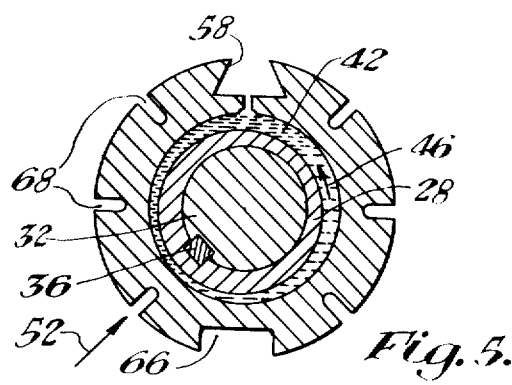

Referring now more particularly to FIGS. 1–5 of the drawings a fluid bearing arrangement 20 shown therein comprises a housing 22, a relatively stationary bearing member or stator 23 and a plurality of eccentric bearing members 24, 26, 28, 30 machined on or otherwise secured to shaft or spindle 32. Although four such eccentric bearing members are illustrated it will be understood that a different number can be employed depending upon the application of the invention. In this example, the bearings 24–30 are discrete members. It will be understood, as noted above, that the bearing members 24–30 alternatively can be milled or otherwise formed in situ on that portion of the shaft 32 adjacent the bearing stator 23.

I prefer to form the bearing members 24–30 apart from the shaft 32 as shown in FIGS. 2–5 and then to attach the bearing members to a concentric journal 34 formed on the shaft 32 and juxtaposed to the bearing stator 23, through which the shaft 32 extends concentrically. Accordingly, each of the bearing members 24–30 is shaped as an eccentric washer or annulus as shown in FIGS. 2–5 and the bearing members are substantially identical in contour. It will be understood, of course that the degree of eccentricity is shown in an exaggerated state for purposes of illustration. In the bearing 20, for example, the eccentricity may lie in the range of about one mil to about 100 mils.

Referring again to FIGS. 2–5 each of the bearing members 24–30 are splined at 36 or otherwise keyed to the shaft journal for rotation therewith. Comparing FIGS. 2–5 it will be seen that the bearing members 24–30 are angularly displaced equidistantly about the shaft journal 34, relative to their directional eccentricities or areas of minimum clearance from the stator 23. Thus, the fluid wedges 38, 40, 42, 44 (FIGS. 2–5) developed by rotation of the shaft 32 in the direction denoted by arrows 46, are likewise displaced equidistantly about the periphery of the shaft journal. In consequence, at a given instant, the maximum hydrodynamic bearing forces produced by the fluid wedges 38–44 are similarly and equidistantly spaced about the shaft journal 34 as denoted respectively by arrows 48, 50, 52, 54.

The magnitude of the forces 48–54 depends, as is well known, upon the degree of eccentricity of the bearing members (which in turn establishes the effective angularity of the fluid wedges 38–44), the rotational speed of the shaft 32, and the viscosity of the fluid injected into the bearing arrangement 20. Computation of these forces can be made with the aid of the known Reynolds' equation.

These considerations illustrate the necessity of arrangement of the bearing 20 such that the hydrodynamic force field, represented instantaneously here by the maximum force vectors 48–54, as nearly equal and symmetrical as possible. In conventional bearings of this type where the eccentric portions are normally located on the bearing stator, the force field induced thereby is likewise stationary. Accordingly, the pattern of bearing forces attributable to each of the eccentric portions is subject to variations caused by manufacturing and operational tolerances, weight of the shaft or spindle, localized heating effects, and the like, as the shaft is revolved.

From my novel bearing arrangement, on the other hand, each of the fluid wedges instead of being stationary is rotated with the rotating eccentric or bearing members 24–30. Thus, each of the rotating and corresponding fluid wedges 38–44 are subject to substantially the same patterns of variations as the shaft revolves with the result that the aforementioned deviations in bearing force are largely cancelled or compensated by the rotating bearing force field.

Further in accordance with my invention I provide a novel adjustability feature for varying the minimum thicknesses of the several fluid wedges 38–44. Although my wedge adjustment is designed to impart, insofar as practical, the same variation to each of the fluid wedges, obviously it is virtually impossible to make a precisely equal adjustment in each of the fluid wedges for any given rotative position of the wedges. Thus, another advantage of the rotating fluid wedge arrangement of my invention lies in the compensation of any very small but inevitable differences in wedge adjustment.

One arrangement for thus adjusting the minimum thicknesses of the fluid wedges (denoted by dimensional arrows 56 in FIG. 2) includes the provision of a split stator structure 23 having a wedge receiving opening 58 adjacent a longitudinal slit 60 in the stator. With this arrangement, longitudinal and vertical wedges 62, 64 (FIG. 3) can be driven into the opening 58 to effect the required adjustment. As better shown in FIGS. 2–5 the wall structure of the stator 23 desirably is weakened at various points by a number of longitudinal grooves 66, 68 to permit uniform diametric expansion or contraction of the walls of the stator 23 while remaining as concentric as possible with the axis of rotation of the shaft 32.

In accordance with another feature of my invention, I import a universal character to the mounting for the bearing stator 23. This permits self-alignment of the stator 23 with the effective axis of rotation of the rotating and bearing force fields 48–54. If the stator 23 were rigidly mounted any slight misalignments thereof would be translated into distortion of the hydrodynamic bearing forces and attendant overheating or other damage to the bearing stator 23 or bearing members 24–30. The gyroscopic effect of the rotating shaft 32, of course, prevents any compensating angular displacement of the shaft rotating axis.

I provide such self-alignment by forming complementary spherical surfaces 67 and 69 (FIG. 1) on the bearing stator 23 and the bearing housing 22 so that the stator 23 is capable of a limited angular displacement of its axis relative to that of the housing 22 or to the rotational axis of the shaft 32. Accordingly an equivalent amount of self-alignment of the stator 23 relative to the effective rotational axis of the rotating bearing members 24–30 is possible.

In this example the bearing stator is provided with an outer lubricational groove 70 for lubrication of the engaging spherical surfaces 66, 68 and with a number of inner lubricational grooves 72 to facilitate the introduction of bearing fluid adjacent each of the bearing members 24, 30.

Figure 6:
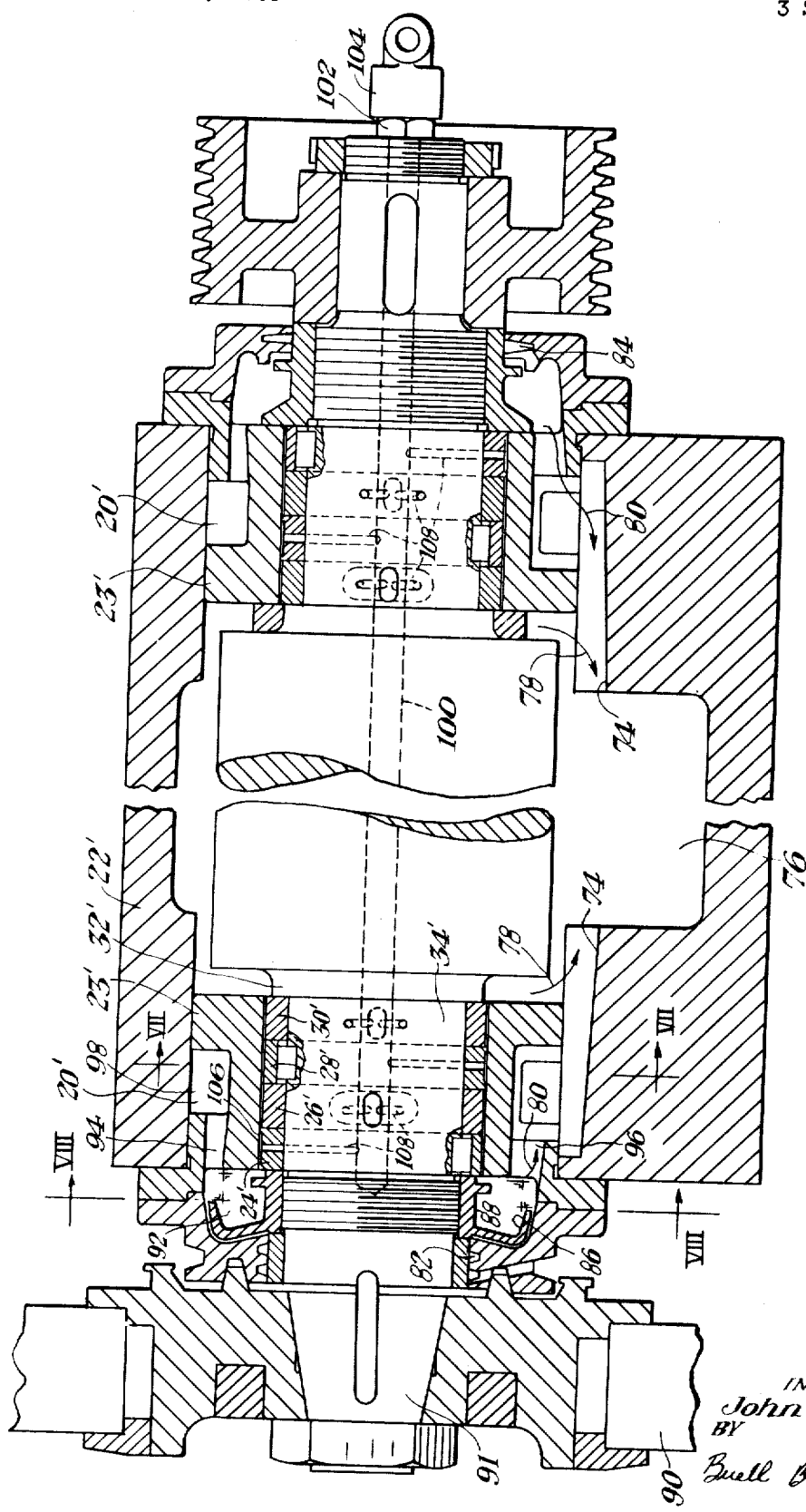
FIG. 6 is a longitudinally sectioned view of a spindle mounting utilizing a modified fluid bearing arrangement.

In many applications, however, the aforedescribed universal mounting of the bearing stator can be eliminated, for example where the bearing members 24', 26', 28', 30' are carefully machined and carefully and equidistantly spaced about the shaft journal 34', as better shown in FIG. 6 of the drawings. In the latter modification of my invention, two bearing arrangements 20' are utilized which are, in this example substantially identical and therefore only one such arrangement will be described in detail. The bearing stators 23' are supported in a common housing 22' having inclined drainage passages 74 and a reservoir 76 in the lower regions thereof. Thus, leakage of bearing fluid from the inward faces (arrows 78) and from the outer faces (arrows 80) of the bearings 20' find their way into the reservoir 76. Outward leakage along the shaft 32' is minized by labyrinthine seals 82 and 84. The labyrinthine seal 82 in this example includes a centrifugal flinger 86 on a bushing 88 which threadedly shaft 32'. The centrifugal flinger 86 is rotated, by rotation of the shaft 32', within a weep space 92 which communicates through a plurality of longitudinal slots 94, 96 as better shown in FIG. 8 with a circumferential collector space 98 in the associated bearing stator 23'. The space 98 in turn communicates with the adjacent bearing housing passage 74 decsribed previously.

A suitable rotating tool such as a grinder disc 90 can be mounted on one or both protruding ends 91 of the shaft 32'.

Figure 7:
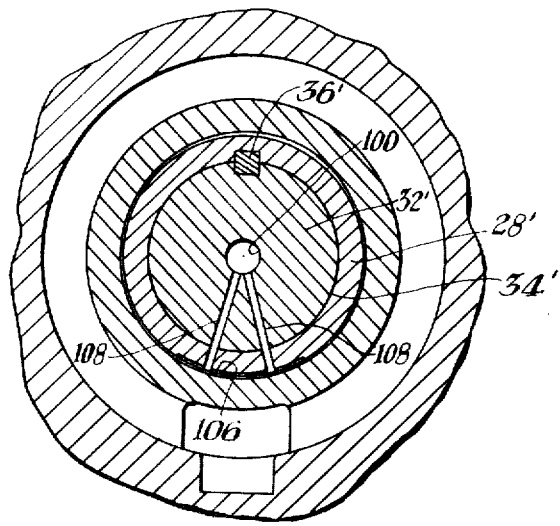
FIG. 7 is a cross sectional view of the apparatus shown in FIG. 6 and taken along reference line VII—VII thereof.
Figure 8:
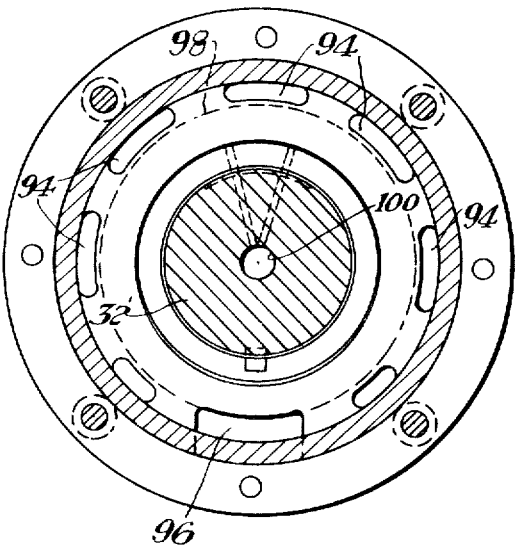
FIG. 8 is another cross sectional view of the apparatus as shown in FIG. 6 and taken along reference line VIII—VIII thereof.

The basic operation of the rotating and eccentric bearing members 24'–30' is essentially similar to that described above in connection with FIGS. 2–5 of the drawings. In the arrangement of FIGS. 6–8 however means are provided for enhancing the maximum forces developed at the narrowest regions or minimum clearance areas of the fluid wedges. In further accordance with my invention I provide means for introducing hydrostatic forces at each of these minimal fluid wedge areas, so that the total available bearing forces are a composite of hydrostatic forces and of the hydrodynamic bearing forces developed by rotation of the shaft 32'. The arrangement according to FIGS. 6–8 is therefore particularly advantageous during starting and stopping the rotation of the shaft 32' at which time the hydrodynamic bearing forces are minimal.

One arrangement for applying hydrostatic bearing forces to the bearings 20' includes a longitudinal fluid passage 100 extending centrally and axially through the shaft or spindle 32'. At one end of the shaft or spindle the central passage 100 communicates with a fitting 102 secured to the end of the shaft 32' and forming part of a rotating seal fitting 104, whereby bearing fluid under suitable pressure is supplied to the shaft passage 100. As better shown in FIGS. 6 and 7 each of the eccentric bearing members is provided with an elongated recess 106 on its outer surface, i.e., adjacent the bearing stator 23'. In this example, each recess 106 is further positioned so as to lie at the region of minimal clearance between each bearing member 24'–30' and the associated bearing stator 23'.

Each of the bearing member recesses 106 communicates with a pair of bearing fluid passages 108 extending through the bearing member and through the adjacent portion of the shaft journal 34' for communication in turn with the central shaft passage 100. Use of plural and diverging passages 108 assures a uniform supply of bearing fluid to all portions of the elongated recesses 106. This in turn assures a prompt and uniform development of hydrostatic pressures at the recesses 106 and a uniform supply of bearing fluid to all parts of the bearing 20'. In particular, bearing fluid can be introduced under pressure directly into the narrowest portions of the fluid wedges when the shaft 32' is rotating. Accordingly, development of the fluid wedges and hydrodynamic bearing forces upon rotation of the shaft 32' is considerably facilitated.

On the other hand, when the shaft 32' is motionless or nearly so, adequate bearing forces are developed hydrostatically from the summation of the individual hydrostatic forces associated with each of the bearing member recesses 106. Owing to the position of these recesses at positions of minimal clearance between the respective bearing members and the bearing stator 23', the fluid pressure and the resulting hydrostatic bearing forces are not materially reduced by leakage of the bearing fluid into the reservoir 76 of the housing 22'.

The structure of FIG. 6 is therefore capable of developing a rotating and compensating bearing force field of a hydrodynamic character at normal operating speeds of the shaft 32'. Under such conditions the hydrodynamic bearing forces, as shown in FIGS. 6–8, are complemented through novel use of hydrostatic bearing forces in accordance with my invention. A uniform application of the several hydrostatic forces is likewise assured, as the areas of application likewise are rotated with the shaft 32'. Most importantly, when the shaft 32' is motionless or nearly so (when significant hydrodynamic bearing forces cannot be developed) adequate bearing forces are developed hydrostatically in accordance with my invention. Needless to say, my combination of means for producing both hydrostatic bearing forces and hydrodynamic bearing forces offers advantageous results even in bearing arrangements wherein the bearing members are located on the bearing stator, such as the stator 23 or 23'. In the latter case, one would not have the added advantage of my improvement in the hydrodynamic aspect.

From the foregoing it will be apparent that novel and efficient forms of fluid bearing arrangements have been described herein. While I have shown and described certain presently preferred embodiments of the invention and have illustrated presently preferred methods of practicing the same, it is to be distinctly understood that the invention is not limited thereto, but may be variously embodied and practiced within the scope of the following claims.

I claim:

1. A fluid bearing arrangement comprising a shaft mounted for rotation thereof, a plurality of eccentric bearing members positioned on said shaft for rotation therewith, said bearing members protruding substantially equal distances respectively from the axis of said shaft, a bearing stator generally surrounding said bearing members and closely spaced therefrom, said stator being positioned substantially concentrically of said shaft, said eccentric bearing members being oriented with respect to said shaft so that their directional eccentricities are spaced equidistantly about said shaft a rotating and compensating bearing force field is created in said fluid.

2. A fluid bearing arrangement comprising a shaft mounted for rotation thereof, a plurality of eccentric bearing members positioned on said shaft for rotation therewith, a bearing stator generally surrounding said bearing members and closely spaced therefrom, said stator being positioned substantially concentrically of said shaft, said eccentric bearing members being oriented with respect to said shaft so that their directional eccentricities are spaced equidistantly about said shaft whereby upon rotation of said shaft a rotating and compensating bearing force field is created, said bearing stator having universal mounting means so that said bearing stator is capable of self-alignment relative to said bearing members and the bearing forces developed thereby.

3. The combination according to claim 1 wherein said bearing members are provided in the form of discrete eccentric washers or annuli and are positioned on a journal of said shaft, said journal being concentric of said bearing stator and of said shaft.

4. A fluid bearing arrangement comprising a shaft mounted for rotation thereof, a plurality of eccentric bearing members positioned on said shaft for rotation therewith, a bearing stator generally surrounding said bearing members and closely spaced therefrom, said stator being positioned substantially concentrically of said shaft, said eccentric bearing members being oriented with respect to said shaft so that their directional eccentricities are spaced equidistantly about said shaft whereby upon rotation of said shaft a rotating and compensating bearing force field is created, said bearing stator having the form of a split ring, and wedge means insertable therein adjacent said split for adjusting the fluid clearances between said bearing members and said stator.

5. The combination according to claim 4 wherein said stator ring is provided with a number of weakened areas spaced about its circumference for maintenance of the concentricity of said stator during adjustment thereof.

6. The combination according to claim 13 wherein passage means through each of said bearing members are provided for introducing a bearing fluid under pressure between each of said bearing members and said bearing stator for developing said hydrostatic forces.

7. The combination according to claim 6 wherein said passage means extend to points adjacent the areas of minimal clearance at said bearing members relative to said stator.

8. A fluid bearing arrangement comprising a shaft mounted for rotation thereof, a plurality of eccentric bearing members positioned on said shaft for rotation therewith, a bearing stator generally surrounding said bearing members and closely spaced therefrom, said stator being positioned substantially concentrically of said shaft, said eccentric bearing members being oriented with respect to said shaft so that their directional eccentricities are spaced equidistantly about said shaft whereby upon rotation of said shaft a rotating and compensating bearing force field is created, means for introducing a bearing fluid under pressure between each of said bearing members and said bearing stator, said fluid introducing means including a shallow recess formed in each of said bearing members.

9. The combination according to claim 8 wherein said recesses are in the areas of minimal clearances at said bearing members so that said hydrostatic forces supplement hydrodynamic forces developed by rotation of said bearing members.

10. A fluid bearing arrangement comprising a shaft mounted for rotation thereof, a plurality of eccentric bearing members positioned on said shaft for rotation therewith, a bearing stator generally surrounding said bearing members and closely spaced therefrom, said stator being positioned substantially concentrically of said shaft, said eccentric bearing members being oriented with respect to said shaft so that their directional eccentricities are spaced equidistantly about said shaft whereby upon rotation of said shaft, a rotating and compensating bearing force field is created, means for introducing a bearing fluid under pressure between each of said bearing members and said bearing stator, said fluid introducing means including an axial passage extending from one end of said shaft to said bearing arrangement and additional passage means coupling said shaft passage with said minimal clearances.

11. The combination according to claim 10 wherein a rotatable seal fitting is mounted adjacent said shaft end, said fitting having a rotatable part joined to said shaft for rotation therewith in communication with said shaft passage.

12. The combination according to claim 10 wherein each of said bearing member recesses are elongated in the circumferential direction thereof, and diverging passages are coupled to remote portions of each of said recesses and to said shaft passage.

13. A fluid bearing arrangement comprising a shaft mounted for rotation thereof, a plurality of eccentric bearing members positioned on said shaft for rotation therewith, a bearing stator generally surrounding said bearing members and closely spaced therefrom, said stator being positioned substantially concentrically of said shaft, said eccentric bearing members being oriented with respect to said shaft so that their directional eccentricities are spaced equidistantly about said shaft whereby upon rotation of said shaft a rotating and compensating bearing force field is created, each of said bearing members including means for developing complementary hydrostatic forces.

14. In a fluid bearing arrangement, the combination comprising at least one hydrodynamic bearing member, means for mounting said bearing member on a rotatable member and adjacent a bearing stator therefor, and means for developing complementary hydrostatic forces in the area of minimal clearance between said bearing member and said stator, said developing means including passage means extending through said rotatable member and said bearing member.

15. In a fluid bearing arrangement, the combination comprising a plurality of hydrodynamic bearing members, means for mounting said bearing members in an angularly displaced array about the adjacent a bearing stator and a rotatable member, and means for developing complementary hydrostatic forces in the areas of minimal clearances between said bearing members and the associated one of said stator and said rotatable member.

16. The combination according to claim 1 wherein means are provided for introducing a bearing fluid under pressure between each of said bearing members and said bearing stator.

17. The combination according to claim 1 wherein the respective widths of said bearing members are substantially equal in the longitudinal direction of said shaft.

References Cited

UNITED STATES PATENTS 3,053,589  9/1962  Cameron _____ 308—122

FOREIGN PATENTS 165,793  4/1950  Austria _____ 308—122
189,217  5/1956  Austria _____ 308—121

FRED C. MATTERN, JR., Primary Examiner

F. SUSKO, Assistant Examiner